US011395969B2

(12) United States Patent
Terada et al.

(10) Patent No.: US 11,395,969 B2
(45) Date of Patent: Jul. 26, 2022

(54) PROCESSING DEVICE, PROGRAM, AND METHOD

(71) Applicant: GungHo Online Entertainment, Inc., Tokyo (JP)

(72) Inventors: Mie Terada, Tokyo (JP); Kento Takeda, Tokyo (JP); Atsushi Kaneko, Miyagi (JP); Tadahiro Shiraishi, Miyagi (JP); Masahito Hatakeyama, Miyagi (JP)

(73) Assignee: GungHo Online Entertainment, Inc.

( * ) Notice: Subject to any disclaimer, the term of this patent is extended or adjusted under 35 U.S.C. 154(b) by 90 days.

(21) Appl. No.: 16/934,798

(22) Filed: Jul. 21, 2020

(65) Prior Publication Data

US 2021/0299564 A1    Sep. 30, 2021

Related U.S. Application Data

(63) Continuation of application No. PCT/JP2020/013003, filed on Mar. 24, 2020.

(51) Int. Cl.
*A63F 13/5375* (2014.01)
*A63F 13/533* (2014.01)
*A63F 13/525* (2014.01)

(52) U.S. Cl.
CPC ........ *A63F 13/5375* (2014.09); *A63F 13/533* (2014.09); *A63F 13/525* (2014.09);
(Continued)

(58) Field of Classification Search
CPC .. A63F 13/5375; A63F 13/533; A63F 13/525; A63F 2300/305; A63F 2300/308; A63F 2300/6661
(Continued)

(56) References Cited

U.S. PATENT DOCUMENTS 9,216,353 B2 * 12/2015 Haswell ................ A63F 13/798
9,568,331 B1 *  2/2017 Narang ............. G01C 21/3617
(Continued)

FOREIGN PATENT DOCUMENTS

JP    H11-306391 A    11/1999
JP    2000-342846 A   12/2000
(Continued)

OTHER PUBLICATIONS

"Metal Gear Solid V the Phantom Pain Tactical Espionage Operations", Dengeki PlayStation, vol. 21, No. 25, p. 15, Aug. 27, 2015.

*Primary Examiner* — Allen Chan
(74) *Attorney, Agent, or Firm* — Harness, Dickey & Pierce, P.L.C.

(57) ABSTRACT

A processing apparatus includes: an input interface configured to receive from a user an input for controlling a movement route of a virtual object arranged in a virtual game space; a memory configured to store arrangement information in the virtual game space and computer readable instructions, the arrangement information being associated with the virtual object; a display configured to display predetermined information; and a processor configured to arrange the virtual object at a predetermined position in the virtual game space based on the arrangement information stored in the memory, calculate a predicted route, along which the virtual object will move from the predetermined position, based on the input via the input interface, and output the predicted route to the display.

20 Claims, 14 Drawing Sheets

(52) U.S. Cl.
CPC ... *A63F 2300/305* (2013.01); *A63F 2300/308* (2013.01); *A63F 2300/6661* (2013.01)

(58) Field of Classification Search
USPC .......................................................... 463/31
See application file for complete search history.

(56) References Cited

U.S. PATENT DOCUMENTS

| | | | |
|---|---|---|---|
| 2004/0056762 A1 | 3/2004 | Rogers | |
| 2004/0180709 A1 | 9/2004 | Takahashi et al. | |
| 2010/0203969 A1* | 8/2010 | Takahashi | A63F 13/10 |
| | | | 463/32 |
| 2010/0306717 A1 | 12/2010 | Yamada et al. | |
| 2012/0077557 A1 | 3/2012 | Miki | |
| 2014/0274240 A1* | 9/2014 | Meadows | A63F 13/812 |
| | | | 463/3 |
| 2015/0157944 A1* | 6/2015 | Gottlieb | A63F 13/25 |
| | | | 463/4 |
| 2017/0103571 A1* | 4/2017 | Beaurepaire | G01C 21/3667 |
| 2019/0134487 A1 | 5/2019 | Kudirka et al. | |
| 2020/0086216 A1 | 3/2020 | Shimomoto | |

FOREIGN PATENT DOCUMENTS

| | | |
|---|---|---|
| JP | 2004-290657 A | 10/2004 |
| JP | 2008-067853 A | 3/2008 |
| JP | 2008-119211 A | 5/2008 |
| JP | 2010-273884 A | 12/2010 |
| JP | 2011-161042 A | 8/2011 |
| JP | 2012-070960 A | 4/2012 |
| JP | 2014-150958 A | 8/2014 |
| JP | 5712400 B1 | 5/2015 |
| JP | 2016-093360 A | 5/2016 |
| JP | 6190018 B1 | 8/2017 |
| JP | 2018-089119 A | 6/2018 |

* cited by examiner

FIG. 5

| OBJECT ID | WEIGHT | ARRANGEMENT COORDINATES | SPEED | MAXIMUM SPEED |
|---|---|---|---|---|
| G1 | W1 | (x1,y1) | V1 | S1 |
| G2 | W2 | (x2,y2) | V2 | S2 |
| G3 | W3 | (x3,y3) | V3 | S3 |
| G4 | W4 | (x4,y4) | V4 | S4 |
| G5 | W5 | (x5,y5) | V5 | S5 |
| ... | ... | ... | ... | ... |

PROCESSING DEVICE, PROGRAM, AND METHOD

CROSS-REFERENCE TO RELATED APPLICATIONS

The present application is a continuation application of International Application No. PCT/JP2020/013003, filed on Mar. 24, 2020, which is expressly incorporated herein by reference in its entirety.

BACKGROUND

1. Technical Field

The present disclosure relates to a processing apparatus, a program, and a method for executing a game application that progresses using the user's current location information.

2. Related Art

Conventionally, there has been known a system for executing a racing game in which a virtual object is moved on a predetermined course in a virtual game space to compete for the speed of movement to a certain point. For example, Japanese Patent Publication No. 2014-150958 A describes a game system in which movement control of a moving object is performed based on input information from a user for traveling on a course set in a virtual game space.

SUMMARY

Therefore, based on the technique described above, in the present disclosure, according to various embodiments, there are provided a processing apparatus, a program, and a method capable of outputting a predicted route of movement of a virtual object in a virtual game space to provide a user with a new preference.

According to an aspect of the present disclosure, there is provided a "processing apparatus including: an input interface configured to receive from a user an input for controlling a movement route of a virtual object arranged in a virtual game space; a memory configured to store arrangement information in the virtual game space so as to be associated with the virtual object in addition to a predetermined instruction command; a display configured to display predetermined information; and a processor configured to arrange the virtual object at a predetermined position in the virtual game space based on the arrangement information stored in the memory, calculate a predicted route, along which the virtual object moves from the predetermined position, based on the input received by the input interface, and execute the instruction command stored in the memory to output the predicted route to the display".

According to an aspect of the present disclosure, there is provided a "program causing a computer including an input interface configured to receive from a user an input for controlling a movement route of a virtual object arranged in a virtual game space, a memory configured to store arrangement information in the virtual game space so as to be associated with the virtual object, and a display configured to display predetermined information to function as: a processor configured to arrange the virtual object at a predetermined position in the virtual game space based on the arrangement information stored in the memory, calculate a predicted route, along which the virtual object moves from the predetermined position, based on the input received by the input interface, and output the predicted route to the display".

According to an aspect of the present disclosure, there is provided a "method performed by a processor executing a predetermined instruction command in a computer including an input interface configured to receive from a user an input for controlling a movement route of a virtual object arranged in a virtual game space, a memory configured to store arrangement information in the virtual game space so as to be associated with the virtual object in addition to the instruction command, and a display configured to display predetermined information, the method including: a step of arranging the virtual object at a predetermined position in the virtual game space based on the arrangement information stored in the memory; a step of calculating a predicted route, along which the virtual object moves from the predetermined position, based on the input received by the input interface; and a step of outputting the predicted route to the display".

According to various embodiments of the present disclosure, it is possible to provide a processing apparatus, a program, and a method capable of outputting a predicted route of movement of a virtual object in a virtual game space to provide a user with a new preference.

In addition, the above-described effects are merely exemplary for convenience of description, and are not limited. In addition to or instead of the above-described effects, any of the effects described in the present disclosure or effects obvious to those skilled in the art can be obtained.

BRIEF DESCRIPTION OF THE DRAWINGS

FIG. 5 is a diagram conceptually illustrating a virtual object information table stored in the terminal apparatus 100 according to the first embodiment of the present disclosure.

DESCRIPTION OF EXEMPLARY EMBODIMENTS

Figure 1:
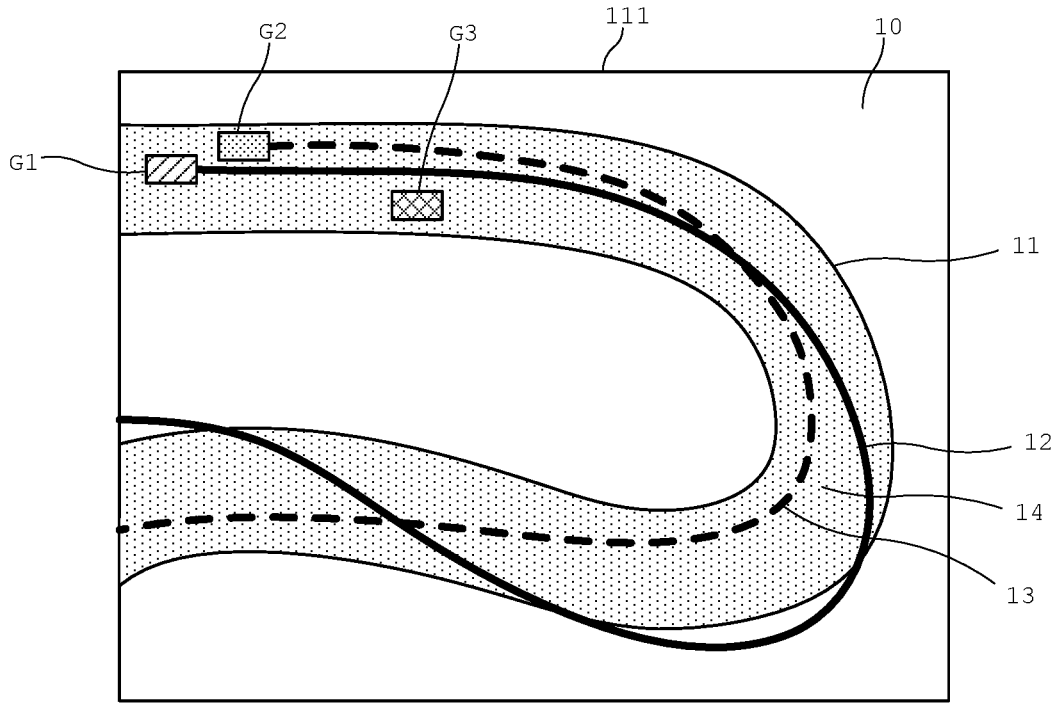
FIG. 1 is a diagram illustrating an example of a screen displayed on a terminal apparatus 100 according to various embodiments of the present disclosure.

Various embodiments of the present disclosure will be described with reference to the accompanying diagrams. In addition, common components in the diagrams are denoted by the same reference numerals.

Overview of Application according to Present Disclosure

In game applications according to various embodiments of the present disclosure, a predicted route of movement of a virtual object can be calculated based on an input relevant to the movement speed of the virtual object received by an input interface, and the predicted route can be output.

As a typical example of such a game application, a racing game in which a user operates a vehicle-shaped virtual object to compete for a speed to a goal can be mentioned. However, without being limited to this, the system according to the present disclosure can be appropriately applied to game applications, such as sports games, battle games, and role playing games. In addition, although there is no intention to limit the system to a specific game application, an outline of the system according to the present disclosure will be described using a racing game or a sports game as an example of the system according to the present disclosure.

FIG. 1 is a diagram illustrating an example of a screen displayed on a terminal apparatus 100 according to various embodiments of the present disclosure. According to FIG. 1, a racing game application is executed on the terminal apparatus 100, and a virtual game space 10 in which various virtual objects, such as a vehicle-shaped virtual object G1, are arranged is displayed on a display 111. Specifically, the virtual object G1 controlled by receiving an input of a user himself or herself holding the terminal apparatus 100 and virtual objects G2 and G3 controlled by other users or a computer are displayed on the display 111. In addition, a traveling road object 11 that is a virtual game object arranged in the virtual game space 10 is displayed on the display 111, and the virtual objects G1 to G3 are arranged on the traveling road object 11. In the game application according to the present disclosure, the speed at which each of the virtual objects G1 to G3 moves on the traveling road object 11 is competed.

Here, in the game application according to the present disclosure, a route when each of the virtual objects G1 to G3 travels on the traveling road object 11 can be predicted in advance, and the result can be displayed on the display 111. Specifically, as illustrated in FIG. 1, a predicted route 12 is set as a predicted route of the virtual object G1, a predicted route 13 is set as a predicted route of the virtual object G2, and a predicted route 14 is set as a predicted route of the virtual object G3. As described above, by outputting the predicted routes of the virtual objects G1 to G3, the user can know in advance a route for traveling in the future. Therefore, since it is possible to perform more strategic control of the virtual object, it is possible to provide the user with a new preference.

For example, in the example illustrated in FIG. 1, when focus is given to the predicted route 12 of the virtual object G1, it can be recognized that protruding from the traveling road object 11 occurs near the middle of the traveling road object 11. Then, since the virtual object G1 deviates from the course if the user moves the virtual object G1 as it is, it is possible to reduce the speed of the virtual object G1 in advance. In addition, similarly, when focus is given to the predicted route 12 of the virtual object G1, it can be recognized that the predicted route 12 of the virtual object G1 crosses the predicted route 13 of the virtual object G2 from the beginning to the middle of the traveling road object 11. Then, since the virtual object G1 may collide with the virtual object G2 if the user moves the virtual object G1 as it is, it is possible to reduce the speed of the virtual object G1 or change the traveling route in advance.

In addition, in the present disclosure, a processing apparatus includes both the terminal apparatus 100 and a server apparatus 200. That is, processing according to each embodiment described below can be performed by any of the terminal apparatus 100 and the server apparatus 200.

In addition, in the example illustrated in FIG. 1, the movement of the virtual object G1 can be controlled by receiving an input from the user himself or herself holding the terminal apparatus 100. However, the movement of another virtual object may be controlled. In addition, the movements of the virtual objects G2 and G3 may be controlled by any of other users and a computer.

In addition, in the example illustrated in FIG. 1, three vehicle-shaped virtual objects of the virtual objects G1 to G3 are arranged in the virtual game space 10. However, only one virtual object may be arranged, or four or more virtual objects may be arranged.

In addition, in the example illustrated in FIG. 1, the predicted routes of the virtual objects G1 to G3 are displayed on the display 111. However, only the predicted route 12 that is the predicted route of the virtual object G1 operated by the user himself or herself may be displayed.

First Embodiment

Figure 2:
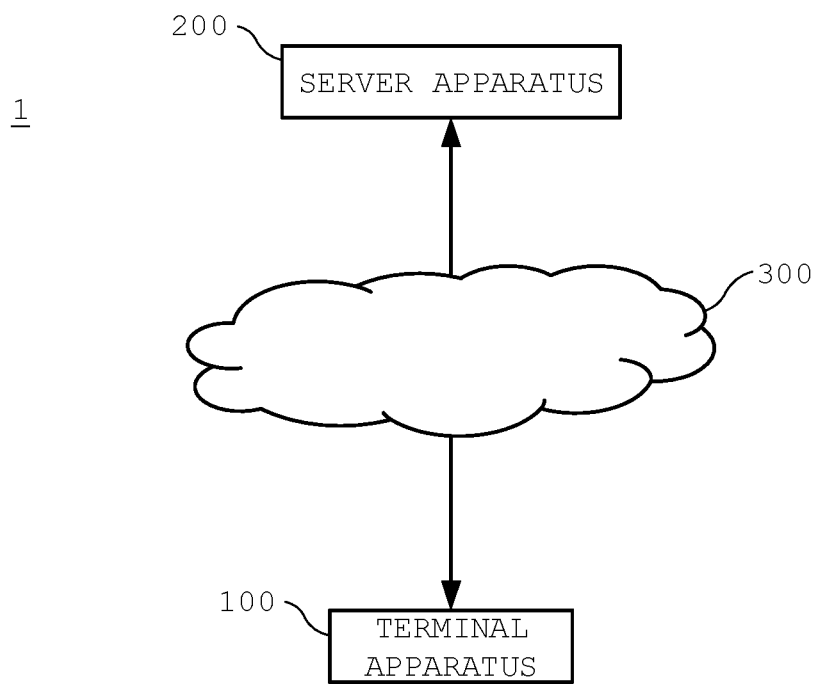
FIG. 2 is a conceptual diagram schematically illustrating the configuration of a system 1 according to a first embodiment of the present disclosure.

1. Configuration of System 1 According to First Embodiment of Present Disclosure FIG. 2 is a conceptual diagram schematically illustrating the configuration of a system 1 according to a first embodiment of the present disclosure. Referring to FIG. 2, the system 1 includes the terminal apparatus 100 and the server apparatus 200 communicably connected to the terminal apparatus 100 through a network 300. In the system 1, the server apparatus 200 and the terminal apparatus 100 execute programs stored in their memories, so that the processing of a game application according to the present embodiment is executed. The server apparatus 200 and the terminal apparatus 100 communicate with each other as necessary to transmit and receive various kinds of information (for example, FIG. 5), programs, and the like necessary for the progress of the application.

In addition, in the example illustrated in FIG. 2, only one terminal apparatus 100 is described. However, it is naturally possible to include two or more terminal apparatuses 100. In addition, although the server apparatus 200 is described as a single apparatus, respective components and processes of the server apparatus 200 can be distributed to a plurality of server apparatuses. In addition, the game application according to the present embodiment is executed by the system 1 including the server apparatus 200 and the terminal apparatus 100, but can also be executed by only one terminal apparatus 100 or a plurality of terminal apparatuses without using the server apparatus 200.

2. Configuration of Terminal Apparatus 100

Figure 3:
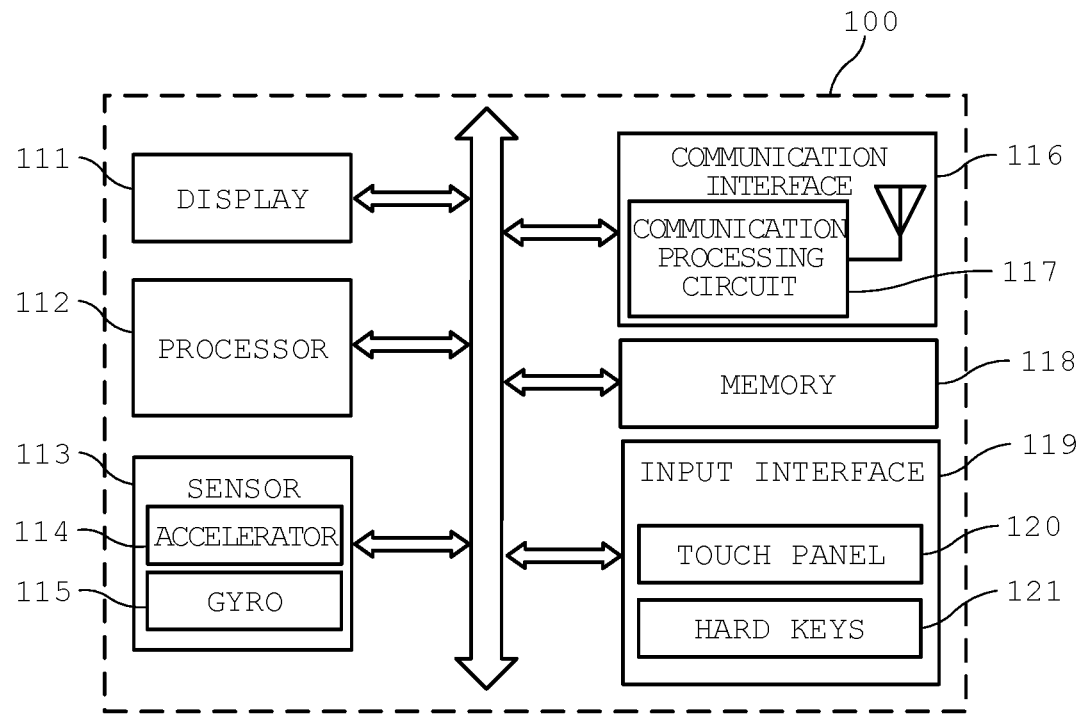
FIG. 3 is a block diagram illustrating an example of the configuration of the terminal apparatus 100 according to the first embodiment of the present disclosure.

FIG. 3 is a block diagram illustrating an example of the configuration of the terminal apparatus 100 according to the first embodiment of the present disclosure. The terminal apparatus 100 does not need to include all of the components illustrated in FIG. 3, and may have a configuration in which some of the components are omitted or may have a configuration in which other components are added.

As an example of the terminal apparatus 100, a portable terminal apparatus capable of performing wireless communication that is represented by a smartphone can be mentioned. However, other than that, any apparatus that can execute the game application according to the present disclosure, such as a portable game machine, a feature phone, a portable information terminal, a PDA, a laptop personal computer, a stationary game machine, and a desktop personal computer, can be appropriately applied. In addition, when the game application according to the present disclosure is executed on a plurality of terminal apparatuses 100, the terminal apparatuses 100 do not necessarily need to be the same or the same type. For example, one terminal apparatus 100 may be a smartphone, and another terminal apparatus 100 may be a portable game machine.

According to FIG. 3, the terminal apparatus 100 includes the display 111, a processor 112, a sensor 113 including an acceleration sensor 114 and a gyro sensor 115, a communication interface 116 including a communication processing circuit 117 and an antenna, a memory 118 including a RAM, a ROM, a nonvolatile memory (in some cases, an HDD), or the like, and an input interface 119 including a touch panel 120 and hard keys 121. Then, these components are electrically connected to each other through a control line and a data line.

The display 111 functions as a display unit that reads image information stored in the memory 118 in response to an instruction from the processor 112 and performs various displays (for example, FIGS. 1, 8, 10A, 10B, 12 to 14, and the like) including a virtual game space formed by the application according to the present embodiment. The display 111 is, for example, a liquid crystal display or an organic EL display.

The input interface 119 includes, for example, the touch panel 120 and/or the hard keys 121, and receives an input or the like from the user relevant to the movement speed of a virtual object arranged in the virtual game space. The touch panel 120 is disposed so as to cover the display 111, and outputs information on position coordinates corresponding to image data displayed on the display 111 to the processor 112. As a touch panel method, a known method such as a resistive film method, a capacitive coupling method, and an ultrasonic surface acoustic wave method can be used. In the present embodiment, the touch panel 120 detects a swipe operation or a tap operation on each icon or the like displayed on the display 111 by the indicator. Then, it is detected that an input relevant to the movement speed has been made according to the detected tap operation. In addition, although the input interface 119 provided in the terminal apparatus 100 is used in the present embodiment, the input interface 119 wirelessly or wired connected to the main body including the processor 112 or the like can also be used.

The processor 112 includes a CPU (microcomputer), and functions as a control unit that controls other connected components based on various programs stored in the memory 118. Specifically, the processor 112 reads a program for executing the application according to the present embodiment or a program for executing the OS from the memory 118 and executes the program. In the present embodiment, the processor 112 performs processing for arranging a virtual object in the virtual game space based on the arrangement position information of the virtual object in the virtual game space stored in the memory 118, processing for calculating a predicted route in which a virtual object moves from a predetermined position based on an input from the user received by the input interface 119, processing for displaying the calculated predicted route on the display 111, and the like. In addition, the processor 112 may be configured by a single CPU, but may be configured by a plurality of CPUs. In addition, other types of processors, such as a GPU specialized in image processing, may be appropriately combined.

The memory 118 includes a ROM, a RAM, a nonvolatile memory, an HDD, and the like, and functions as a storage unit. The ROM stores an instruction command for executing the application according to the present embodiment or the OS as a program. The RAM is a memory used to write and read data while the program stored in the ROM is being processed by the processor 112. The nonvolatile memory is a memory in which data is written and read by executing the program, and the data written here is stored even after the execution of the program is completed. In the present embodiment, programs for processing for arranging a virtual object in the virtual game space based on the arrangement position information of the virtual object in the virtual game space stored in the memory 118, processing for calculating a predicted route in which a virtual object moves from a predetermined position based on an input from the user received by the input interface 119, processing for displaying the calculated predicted route on the display 111, and the like are stored in the memory 118. In addition, a virtual object information table (FIG. 5) is stored in the memory 118, and is updated as necessary according to the processing of the processor 112.

The communication interface 116 functions as a communication unit that transmits and receives information to and from the server apparatus 200 or other terminal apparatuses installed remotely through the communication processing circuit 117 and the antenna. The communication processing circuit 117 performs processing for receiving a program for executing the game application according to the present embodiment, various kinds of information used in the game application, and the like from the server apparatus 200 in accordance with the progress of the game application. In addition, processing for transmitting the result of the processing according to the execution of the game application to the server apparatus 200 is performed. In the present embodiment, in particular, user ID information and the like are transmitted to the server apparatus 200, and information regarding the virtual object and the like are received from the server apparatus 200.

The communication processing circuit 117 is processed based on a broadband wireless communication system represented by the LTE system, but can perform processing based on a narrowband wireless communication method such as wireless LAN represented by IEEE802.11 or Bluetooth (registered trademark). In addition, instead of or in addition to wireless communication, wired communication can be used.

The sensor 113 includes the acceleration sensor 114 and the gyro sensor 115, and can function as an input unit together with the input interface 119. Specifically, it is possible to detect a change in the posture of the terminal apparatus 100 by using the acceleration sensor 114 and/or the gyro sensor 115 and control the movement of the virtual object according to the detected change amount.

3. Configuration of Server Apparatus 200

Figure 4:
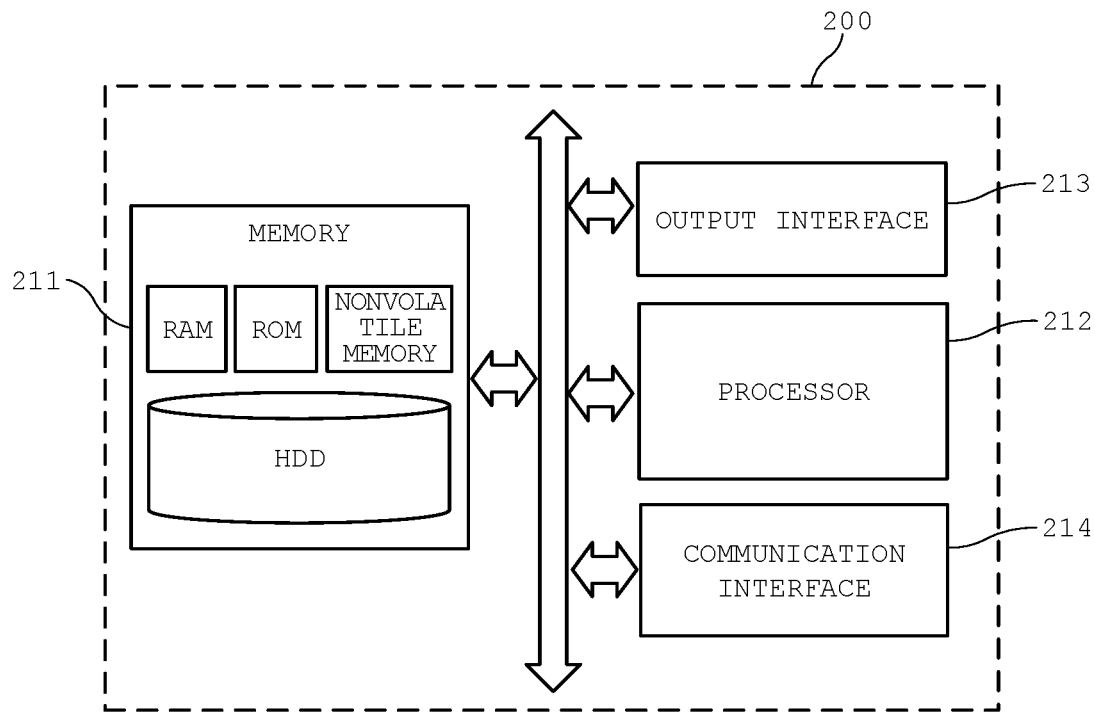
FIG. 4 is a block diagram illustrating an example of the configuration of a server apparatus 200 according to the first embodiment of the present disclosure.

FIG. 4 is a block diagram illustrating an example of the configuration of the server apparatus 200 according to the first embodiment of the present disclosure. The server apparatus 200 does not need to include all of the components illustrated in FIG. 4, and may have a configuration in which some of the components are omitted or may have a configuration in which other components are added.

According to FIG. 4, the server apparatus 200 includes a memory 211 including a RAM, a ROM, a nonvolatile memory, an HDD, and the like, a processor 212 including a CPU and the like, an output interface 213, and a communication interface 214. Then, these components are electrically connected to each other through a control line and a data line.

The memory 211 includes a RAM, a ROM, a nonvolatile memory, and an HDD, and functions as a storage unit. The memory 211 stores an instruction command for executing the application according to the present embodiment or the OS as a program. Such a program is loaded and executed by the processor 212. In addition, the memory 211 stores information of each virtual object arranged in the virtual game space or drawing information thereof, user information regarding a user who executes the game application, and the like, in addition to the virtual object information table illustrated in FIG. 5. In addition, the memory 211 (especially, the RAM) is temporarily used to execute writing and reading of data while the program is being executed by the processor 212. In the present embodiment, programs for executing processing for receiving user identification information of each user from each terminal apparatus 100 to authenticate the user, processing for transmitting various kinds of information required to execute the game application to the terminal apparatus 100 when the user is recognized as a legitimate user as a result of the authentication, processing for receiving an execution result of the game application performed on the terminal apparatus 100 from the terminal apparatus 100 and updating user information, and the like are stored.

In addition, in the present embodiment, a case where the terminal apparatus 100 functions as a processing apparatus will be mainly described. However, the server apparatus 200 can also function as a processing apparatus. That is, when the server apparatus 200 functions as a processing apparatus, programs for executing processing for arranging a virtual object in the virtual game space based on the arrangement position information of the virtual object in the virtual game space stored in the memory 211, processing for receiving an input from the user received by the input interface 119 of the terminal apparatus 100 and calculating a predicted route in which a virtual object moves from a predetermined position, processing for outputting the calculated predicted route to the terminal apparatus 100, and the like are stored in the memory 211.

The processor 212 includes a CPU (microcomputer), and functions as a control unit for controlling other connected components based on various programs stored in the memory 211. In the present embodiment, in particular, the processor 212 performs processing for receiving user identification information of each user from each terminal apparatus 100 to authenticate the user, processing for transmitting various kinds of information required to execute the game application to the terminal apparatus 100 when the user is recognized as a legitimate user as a result of the authentication, and processing for receiving an execution result of the game application performed on the terminal apparatus 100 from the terminal apparatus 100 and updating user information. The processor 212 may be configured by a single CPU, but may be configured by a plurality of CPUs.

In addition, in the present embodiment, a case where the terminal apparatus 100 functions as a processing apparatus will be mainly described. However, the server apparatus 200 can also function as a processing apparatus. That is, when the server apparatus 200 functions as a processing apparatus, the processor 212 performs processing for arranging a virtual object in the virtual game space based on the arrangement position information of the virtual object in the virtual game space stored in the memory 211, processing for receiving an input from the user received by the input interface 119 of the terminal apparatus 100 and calculating a predicted route in which a virtual object moves from a predetermined position, processing for outputting the calculated predicted route to the terminal apparatus 100, and the like.

As an example, the communication interface 214 performs processing, such as modulation or demodulation, in order to transmit and receive a program for executing the game application according to the present embodiment, various kinds of information, and the like through the terminal apparatus 100 and a network 300 or through another server apparatus and the network 300. The communication interface 214 communicates with each terminal apparatus or another server apparatus according to the above-described wireless communication method or a known wired communication method. In the present embodiment, in particular, user information and the like are received from the terminal apparatus 100, and virtual object information and the like are transmitted to the terminal apparatus 100.

Although not illustrated, the output interface 213 functions as an information input and output unit for inputting and outputting information to and from various external apparatuses, such as a printer and a display. As the output interface 213, a known connection format such as a serial port, a parallel port, or a USB can be adopted as desired.

4. Information Stored in Each Memory

FIG. 5 is a diagram conceptually illustrating a virtual object information table stored in the terminal apparatus 100 according to the first embodiment of the present disclosure. As an example, when virtual object information is received from the server apparatus 200, the information is received in the virtual object information table stored in the memory 118.

According to FIG. 5, in the virtual object table, weight information, arrangement coordinate information, and maximum speed information are stored so as to be associated with object ID information. "Object ID information" is unique information given to each vehicle-shaped virtual object controlled by a user or a computer, and is information for specifying each virtual object. "Weight information" is one of the pieces of attribute information of each virtual object, and is information for specifying the weight that the virtual object virtually has. The weight information is one of the parameters that determine the turning performance when each virtual object turns the curve of the traveling road. "Arrangement coordinate information" is information indicating the current arrangement position of each virtual object in the virtual game space. As an example, when the virtual game space is formed by a two-dimensional coordinate space, the information is expressed as two-dimensional coordinates. Each time the arrangement position in the virtual game space is updated according to the progress of the processing of the processor 112, the information is updated. "Speed information" is information indicating the current movement speed of each virtual object. The information is updated as necessary based on the input received by the input interface 119. "Maximum speed information" is one of the pieces of attribute information of each virtual object, and is information for determining an upper limit speed at which the virtual object can be accelerated. That is, each virtual object can accelerate to the speed specified by the maximum speed information.

5. Process Flow Performed in Terminal Apparatus 100

Figure 6:
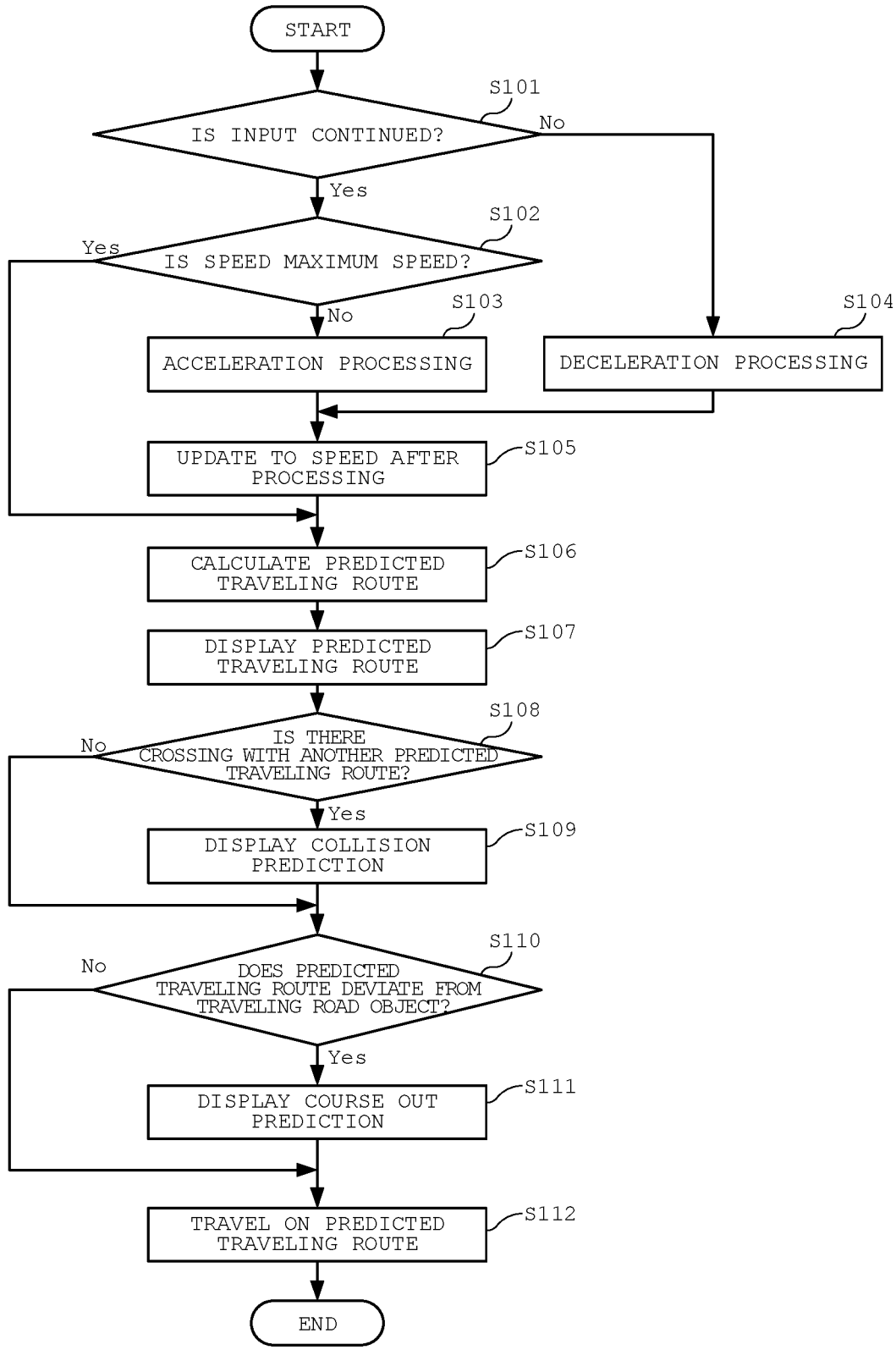
FIG. 6 is a diagram illustrating a process flow executed in the terminal apparatus 100 according to the first embodiment of the present disclosure.

FIG. 6 is a diagram illustrating a process flow executed in the terminal apparatus 100 according to the first embodiment of the present disclosure. Specifically, FIG. 6 is a process flow that is executed after a game application is started by a user and a racing game using a plurality of vehicle-shaped virtual objects is started in the virtual game space 10. The process flow is mainly performed when the processor 112 reads and executes a program stored in the memory 118 at predetermined periods.

According to FIG. 1, the process flow is started when the processor 112 arranges each virtual object at a predetermined position in the virtual game space based on the arrangement coordinate information stored in the virtual object information table of the memory 118. Then, the processor 112 determines whether or not an input relevant to the movement speed of the virtual object that can be controlled by the user himself or herself is received by the input interface 119 and the input is continued (S101). An example of the input is a user's tap operation on an arbitrary position on the touch panel 120 superimposed on the display 111. In addition, although the tap operation on an arbitrary position is performed in the present embodiment, a tap operation at a specific position may be performed, or an operation on a specific key of the hard keys 121 may be performed.

If it is determined that the input is continued, the processor 112 determines whether or not the current speed (for example, "V1") of the virtual object stored as speed information has reached the maximum speed (for example, "S1") of the virtual object stored as maximum speed information with reference to the virtual object information table in the memory 118 (S102). Then, if it is determined that the current speed has not yet reached the maximum speed, the processor 112 performs acceleration processing for increasing the speed of the virtual object (S103). As an example, the acceleration processing is performed by measuring the time during which an input is continued based on the determination result in S101 and adding the acceleration amount corresponding to the duration to the current speed with reference to an acceleration table (table indicating the correspondence between the duration and the acceleration amount) stored in advance in the memory 118. In addition, this acceleration table may be provided for each virtual object, or may be provided in common for all virtual objects.

On the other hand, if it is determined that the reception of the input has ended and is not continued in S101, deceleration processing for reducing the speed of the virtual object is performed (S104). As an example, the deceleration processing is performed by measuring the time from the end of the reception of the input and subtracting the deceleration amount corresponding to the time from the end designation from the current speed with reference to a deceleration table (table indicating the correspondence between the time from the end and the deceleration amount) stored in advance in the memory 118. In addition, this deceleration table may be provided for each virtual object, or may be provided in common for all virtual objects.

Then, the processor 112 receives the result of the acceleration processing or the deceleration processing, and performs processing for updating the speed information of the virtual object (S105). Specifically, processing is performed in which the new speed of the virtual object calculated by the acceleration processing or the subtraction processing is updated to speed information in the virtual object information table of the memory 118 and the updated speed information is stored. In addition, if the speed of the virtual object has already reached the maximum speed in S102, the acceleration processing is not performed. Therefore, in this case, the processing for updating the speed information of the virtual object is not performed.

Then, the processor 112 performs processing for calculating a predicted traveling route of each virtual object (S106). The details of the processing will be described in detail later. Then, the processor 112 performs processing for displaying the calculated predicted traveling route of each virtual object on the display 111 (S107). In addition, at this time, if the calculated predicted traveling routes of the virtual objects cross each other, that is, if a collision between the virtual objects is predicted (S108), the processor 112 displays a collision prediction on the display 111 (S109). In addition, if the calculated predicted route deviates from a traveling road object recommended for the travel of the virtual object, that is, if it is predicted that the virtual object will deviate from the course (S110), the processor 112 displays a course out prediction on the display 111 (S111). Then, the processor 112 performs processing for making the virtual object travel on the calculated predicted traveling route. In this manner, the process flow ends.

6. Calculation of Predicted Route

Figure 7:
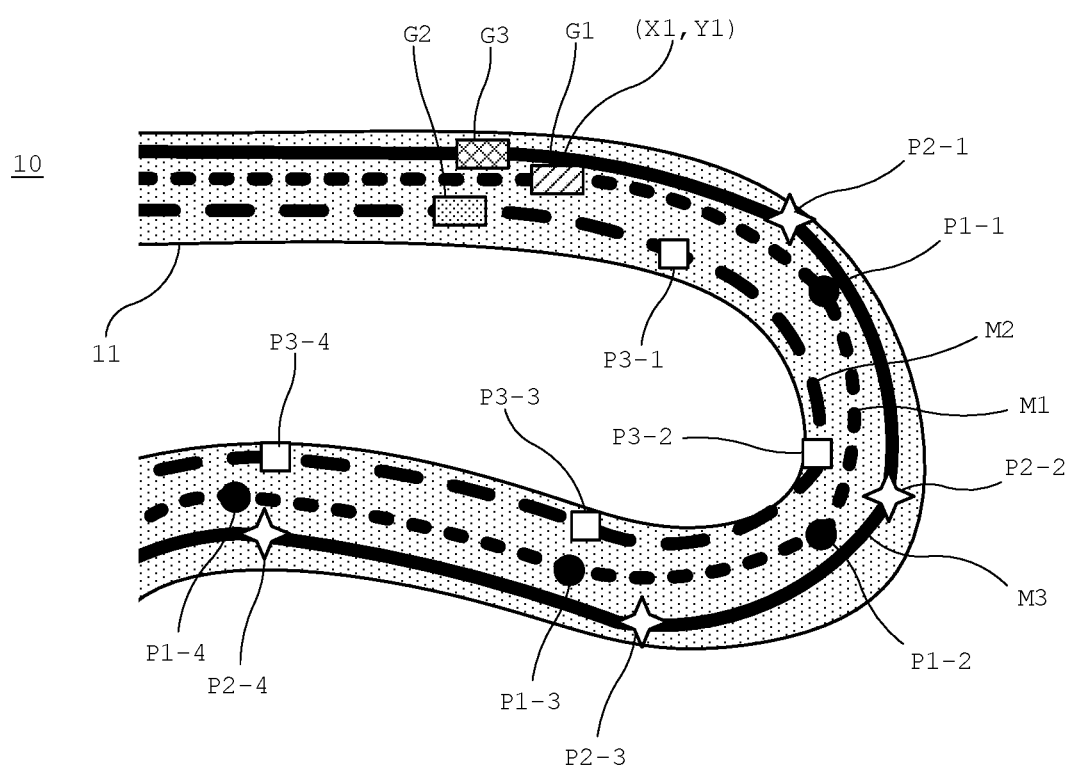
FIG. 7 is a diagram conceptually illustrating a virtual game space of a game application according to the first embodiment of the present disclosure.

FIG. 7 is a diagram conceptually illustrating a virtual game space of the game application according to the first embodiment of the present disclosure. According to FIG. 7, the traveling road object 11 on which each virtual object is recommended to move (that is, travel) is arranged on the virtual game space 10. In addition, on the virtual game space 10, the virtual objects G1 to G3 are arranged based on the arrangement coordinate information of the virtual object information table.

Here, the memory 118 stores one or more recommended routes in advance for the traveling road object 11. In FIG. 7, position coordinates on recommended routes M1, M2, and M3 are stored at predetermined intervals as the recommended routes. The recommended routes M1 to M3 indicate routes on which each virtual object travels when predetermined conditions (such as the speed of each virtual object) are satisfied. That is, as illustrated in FIG. 7, the arrangement coordinates of each of the virtual objects G1 to G3 are set so as to travel on any of the recommended routes M1 to M3 as long as the predetermined conditions are satisfied.

Then, if the predetermined conditions are satisfied, the predicted traveling route of each of the virtual objects G1 to G3 is set on the recommended route. Specifically, the processor 112 refers to the speed information in the virtual object information table of the memory 118. Then, if the speed specified by the speed information does not exceed a predetermined threshold value, the processor 112 calculates a traveling route in a predetermined period in the future assuming that the virtual object has moved at the specified speed.

As an example of prediction of a traveling route, the virtual object G1 will be described. According to FIG. 7, the virtual object G1 is currently arranged at the position of the arrangement coordinates (X1, Y1) on the recommended route M1, and the speed at that time is V1. The speed V1 is equal to or less than a predetermined threshold value. Therefore, the processor 112 calculates a distance to move at the speed V1 for one second, two seconds, three seconds, and four seconds. Then, the processor 112 sets a position on the recommended route M1 corresponding to each calculated distance as a predicted position after each second (P1-1: after one second, P1-2: after two seconds, P1-3: after three seconds, P1-4: after four seconds). Then, the processor 112 calculates a curve connecting the calculated predicted positions along the recommended route M1 as a predicted route.

In addition, also for the virtual objects G2 and G3, similarly to the virtual object G1, the processor 112 sets a predicted position after each second (P2-1 (after one second), P2-2 (after two seconds), P2-3 (after three seconds), and P2-4 (after four seconds) for the virtual object G2, and P3-1 (after one second), P3-2 (after two seconds), P3-3 (after three seconds), and P3-4 (after four seconds) for the virtual object G3), and then calculates a curve connecting the calculated predicted positions along the recommended routes M2 and M3 as a predicted route. In the flowchart of FIG. 6 repeated at predetermined periods, the processor 112 calculates the predicted route each time the predicted route is calculated (S106).

Figure 8:
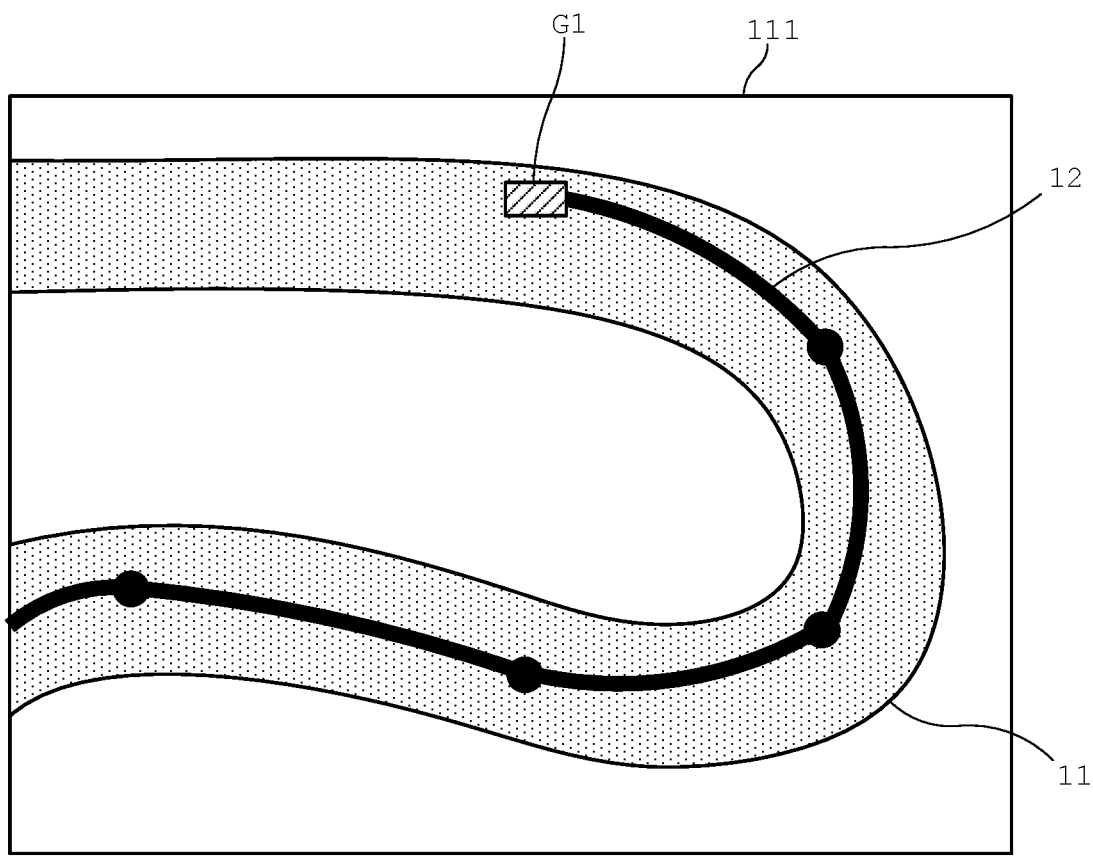
FIG. 8 is a diagram illustrating an example of a screen displayed on the terminal apparatus 100 according to the first embodiment of the present disclosure.

FIG. 8 is a diagram illustrating an example of a screen displayed on the terminal apparatus 100 according to the first embodiment of the present disclosure. According to FIG. 8, the processor 112 outputs the traveling road object 11 to be displayed on the display 111, and displays the current position of the virtual object G1 and the calculated predicted route 12 so as to be superimposed on the traveling road object 11. In addition, in the example of FIG. 8, only the virtual object G1 whose movement can be controlled by the user himself or herself and the predicted route M12 thereof are displayed. However, it is natural that the virtual objects G2 and G3 controlled by other users or a computer and their predicted routes may be displayed.

Figure 9:
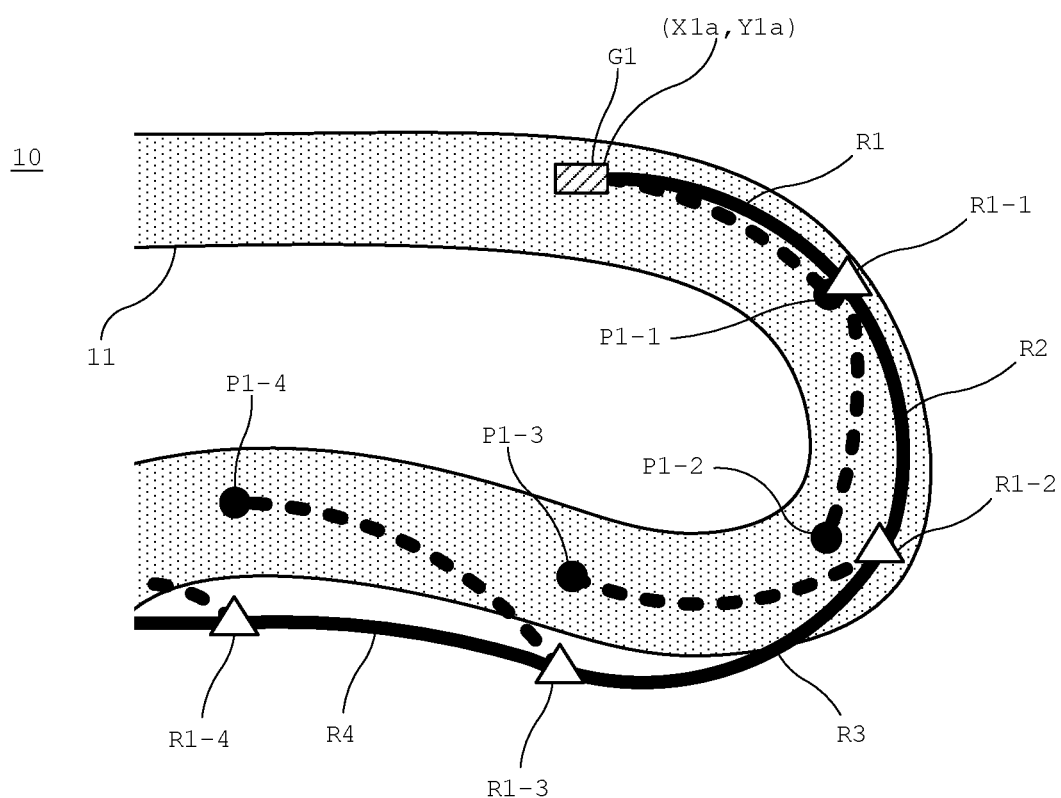
FIG. 9 is a diagram conceptually illustrating a virtual game space of a game application according to the first embodiment of the present disclosure.

FIG. 9 is a diagram conceptually illustrating a virtual game space of the game application according to the first embodiment of the present disclosure. Specifically, FIG. 9 is a diagram illustrating a predicted route when the speed of the virtual object G1 exceeds a predetermined threshold value. The predicted route is calculated as follows.

According to FIG. 9, the virtual object G1 is arranged at the position of the arrangement coordinates (X1a, Y1a) on the recommended route. In addition, points when the virtual object G1 travels at a speed within a predetermined threshold value for one second, two seconds, three seconds, and four seconds are calculated (P1-1 to P1-4).

Here, the speed of the virtual object G1 becomes a speed V1a as a result of controlling the movement speed of the virtual object G1 according to the duration of the input received by the input interface 119 (S101 to S105 in FIG. 6) at the point in time described in FIG. 9. The speed V1a is equal to or higher than a predetermined threshold value. The processor 112 calculates the position of the virtual object G1 when it is assumed that the virtual object G1 has traveled at the speed V1a for one second. At this time, the processor 112 calculates a turning angle at the speed V1a with reference to weight information (virtual object information table) that is a parameter indicating the turning performance of the virtual object G1. Then, based on the calculated turning angle, the processor 112 calculates a position R1-1 bulging outward from a curve, which makes a connection from the current arrangement position to a position P1-1 on the recommended route after one second, as a predicted position of the virtual object G1 after one second. Then, based on the calculated turning angle at the speed Via, the processor 112 calculates a position R1-2 further bulging outward from a curve, which connects the position R1-1 to a position P1-2 on the recommended route after two seconds, as a predicted position of the virtual object G1 after two seconds. Then, based on the calculated turning angle at the speed Via, the processor 112 calculates a position R1-3 further bulging outward from a curve, which connects the position R1-2 to a position P1-3 on the recommended route after three seconds, as a predicted position of the virtual object G1 after three seconds. In addition, based on the calculated turning angle at the speed Via, the processor 112 calculates a position R1-4 further bulging outward from a curve, which connects the position R1-3 to a position P1-4 on the recommended route after four seconds, as a predicted position of the virtual object G1 after four seconds. Then, the processor 112 calculates a curve (R1 to R4) connecting the calculated positions R1-1 to R1-4 as a predicted route. Thereafter, the processor 112 causes the virtual object G1 to travel on the calculated predicted route, that is, on the curve (R1 to R4).

In addition, also for the virtual objects G2 and G3, when the current speed of each virtual object exceeds a predetermined threshold value, the calculation of the predicted route is performed based on the current speed information and the weight information similarly to the virtual object G1.

Figure 10A:
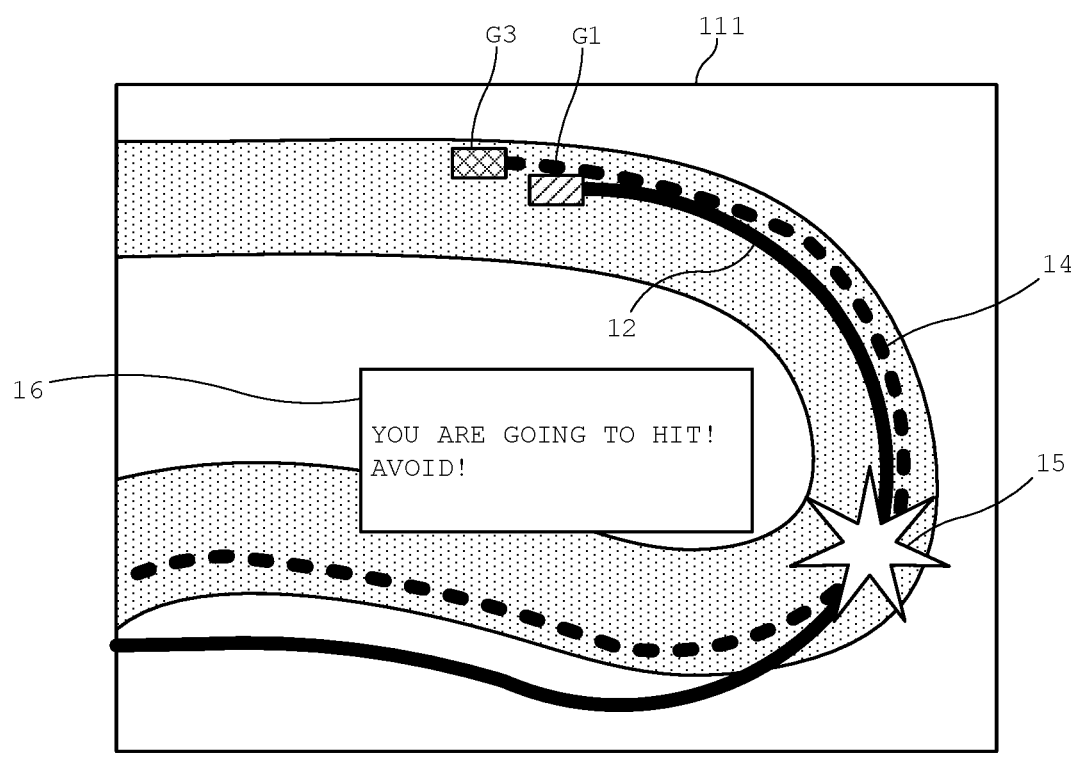
FIG. 10A is a diagram illustrating an example of a screen displayed on the terminal apparatus 100 according to the first embodiment of the present disclosure.

FIG. 10A is a diagram illustrating an example of a screen displayed on the terminal apparatus 100 according to the first embodiment of the present disclosure. According to FIG. 10A, the processor 112 outputs the traveling road object 11 to be displayed on the display 111, and displays the current position of the virtual object G1 and the calculated predicted route 12 in FIG. 9 so as to be superimposed on the traveling road object 11. In addition, the processor 112 similarly displays the separately calculated predicted route 14 of the virtual object G3.

Here, the predicted route 12 of the virtual object G1 calculated by the method illustrated in FIG. 9 partially crosses the separately calculated predicted route 14 of the virtual object G3. This indicates that if the virtual object G1 travels at the current speed (speed Via), the virtual object G1 may collide with the virtual object G3. That is, the processor 112 performs control to display a display 15 and a display 16 for warning the user of the possibility of collision on the display 111. Therefore, the user can grasp in advance an event that may occur in the future and control the speed of the virtual object G1 in advance. In addition, although the virtual object G2 and its predicted route are not displayed in FIG. 10A, these can also be displayed on the display 111 similarly.

Figure 10B:
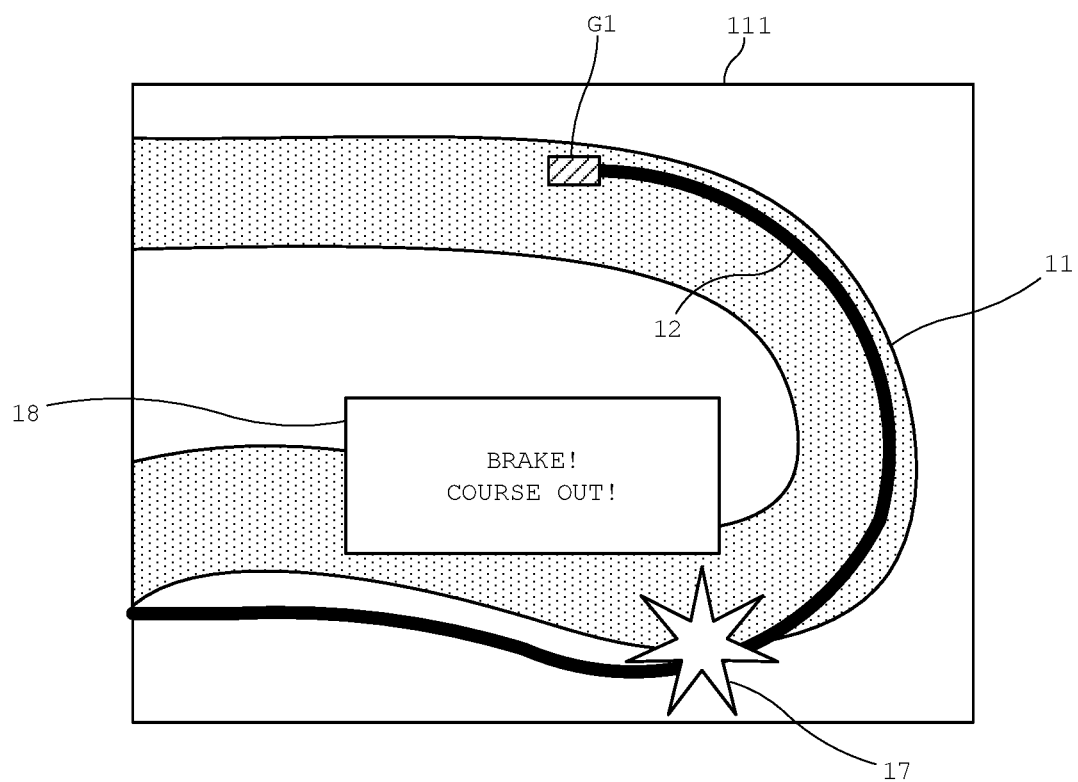
FIG. 10B is a diagram illustrating an example of a screen displayed on the terminal apparatus 100 according to the first embodiment of the present disclosure.

FIG. 10B is a diagram illustrating an example of a screen displayed on the terminal apparatus 100 according to the first embodiment of the present disclosure. According to FIG. 10B, the processor 112 outputs the traveling road object 11 to be displayed on the display 111, and displays the current position of the virtual object G1 and the calculated predicted route 12 in FIG. 9 so as to be superimposed on the traveling road object 11.

Here, a part of the predicted route 12 of the virtual object G1 calculated by the method illustrated in FIG. 9 is set at a position deviating from the traveling road object 11. This indicates that if the virtual object G1 travels at the current speed (speed V1a), the virtual object G1 may deviate from the traveling road object 11 as a course. Therefore, the processor 112 performs control to display a display 17 and a display 18 for warning the user of the possibility of the course out on the display 111. Therefore, the user can grasp in advance an event that may occur in the future and control the speed of the virtual object G1 in advance.

Figure 11:
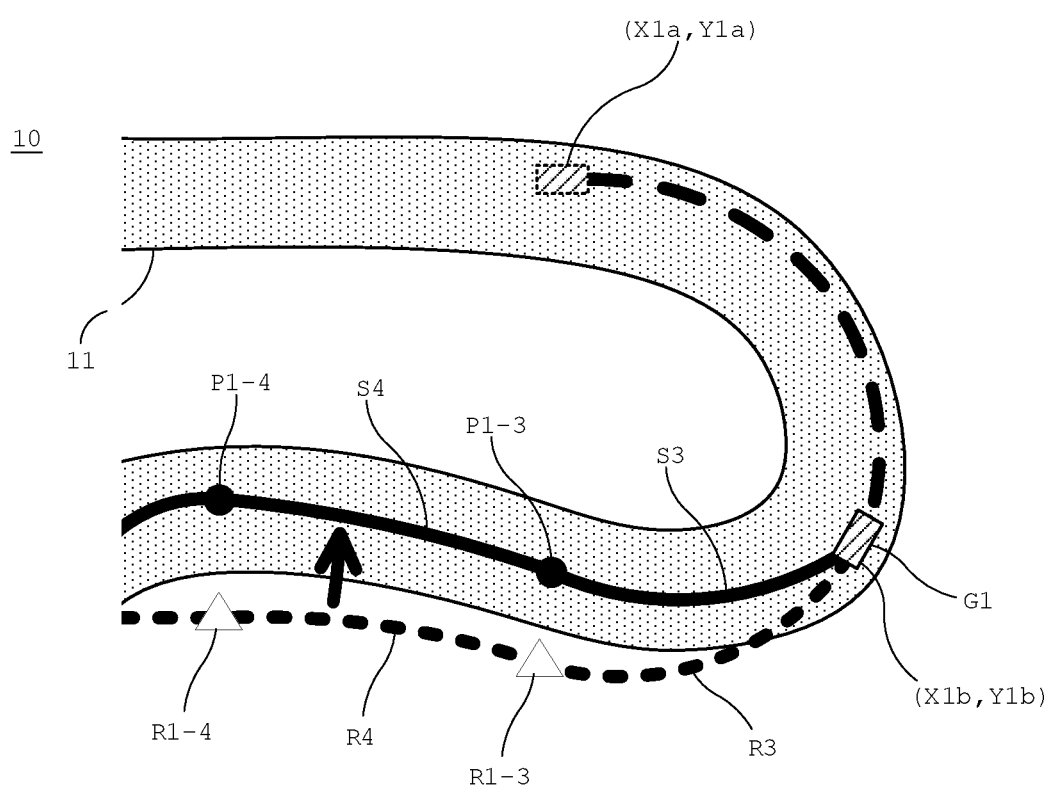
FIG. 11 is a diagram conceptually illustrating a virtual game space of a game application according to the first embodiment of the present disclosure.

FIG. 11 is a diagram conceptually illustrating a virtual game space of the game application according to the first embodiment of the present disclosure. Specifically, FIG. 11 is a diagram for describing the calculation of a predicted route after the virtual object G1 has moved from the position coordinates (X1a, Y1a) to (X1b, Y1b) at the speed V1a.

According to FIG. 11, as described above, the virtual object G1 moves at the speed V1a from the position coordinates (X1a, Y1a) to (X1b, Y1b). Therefore, the traveling route is along the curves R1 and R2 calculated in FIG. 9. Here, in the example of FIG. 11, a case is illustrated in which deceleration processing is performed by the processing of S101 to S105 in FIG. 6 when the virtual object G1 reaches the coordinate position (X1b, Y1b), so that the speed of the virtual object G1 is decelerated to V1 equal to or less than a predetermined threshold value. That is, a case is illustrated in which deceleration processing is performed when the reception of the user input by the input interface 119 ends at the coordinate position (X1b, Y1b), so that the speed is reduced from the speed V1a to V1.

At this time, a predicted route at the coordinate position (X1b, Y1b) is set so as to approach the predicted position P1-3 on the recommended route M1 calculated in FIG. 7, since the speed is equal to or less than the threshold value. In addition, a predicted route from the predicted position P1-3 is also set to the predicted position P1-4 along the recommended route M1 calculated in FIG. 7, since the speed is equal to or less than the threshold value. That is, the predicted route after the coordinate position (X1b, Y1b) is set to curves S3 and S4 connecting the coordinate position and the predicted positions P1-3 and P1-4. Therefore, if the virtual object travels with the coordinate position (X1a, Y1a), the virtual object travels on the curves R3 and R4, and a course out or a collision with another virtual object is predicted. However, by performing deceleration, the vehicle returns to the recommended route M1, so that the course out or the collision is avoided. Then, the processor 112 controls the movement of the virtual object so that the virtual object moves on the predicted route calculated again. In this manner, even if a future predicted route is once determined, it is possible to change the traveling route and the subsequent predicted route in real time according to an instruction input while the virtual object is on the predicted route.

In addition, in the present embodiment, the predicted route of the virtual object up to a predetermined period (for example, four seconds) ahead is calculated and displayed according to the current speed of the virtual object. Therefore, for example, when the speed is too low, the position of movement during the period is extremely short, which is not very meaningful. Therefore, for example, before calculating the predicted route in S106 of FIG. 6, it may be determined whether or not the speed of the virtual object exceeds a predetermined lower limit speed, prediction may be performed only when the speed is higher than the speed, and the predicted route may be output.

As described above, in the present embodiment, the predicted route of the movement of the virtual object in the virtual game space is output to the display 111. Therefore, the user can know in advance a route for traveling in the future. As a result, it is possible to provide the user with new preferences and strategies that have never been seen before.

Second Embodiment

In the first embodiment, the predicted route of the movement of the virtual object in the virtual game space is output to the display 111. In the second embodiment, in addition to the above, the processor 112 further outputs the trajectory of each virtual object that has moved so far to the display 111. In addition, the present embodiment is the same as the configuration, the processing, and the procedure in the first embodiment, except for points specifically described below. Therefore, detailed description of those matters will be omitted.

Figure 12:
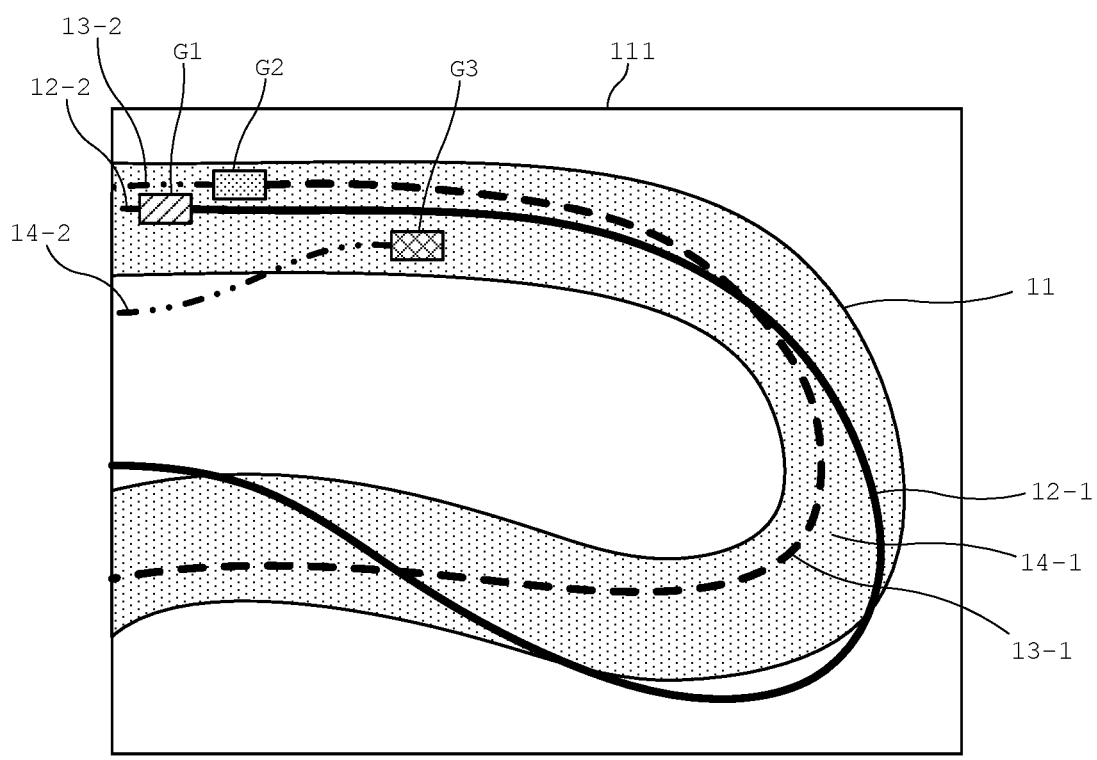
FIG. 12 is a diagram illustrating an example of a screen displayed on the terminal apparatus 100 according to a second embodiment of the present disclosure.

FIG. 12 is a diagram illustrating an example of a screen displayed on the terminal apparatus 100 according to the second embodiment of the present disclosure. According to FIG. 12, under the control of the processor 112, the virtual objects G1 to G3 and their predicted routes 12-1 to 14-1 are displayed on the display 111 together with the traveling road object 11. In addition, in the present embodiment, in addition to these, trajectories 12-2 to 14-2 of the virtual objects G1 to G3 that have traveled to the current arrangement position are displayed. Specifically, the processor 112 stores information of passing coordinates over a predetermined period, for example, every second, in the virtual object information table of the memory 118 so as to be associated with each piece of object identification information. Then, the processor 112 calculates curves connecting the stored coordinate information, and performs controls to display the curves on the display 111 as the trajectories 12-2 to 14-2.

As described above, in the present embodiment, in addition to the predicted route of each virtual object, it is possible to output the trajectory along which each virtual object has traveled. Therefore, in addition to the effect obtained by the first embodiment, the user can also know the past traveling tendency of each virtual object.

Third Embodiment

In the first and second embodiments, when the predicted route of the movement of the virtual object in the virtual game space is output to the display 111, the virtual game space 10 is displayed from a bird's-eye point of view. In a third embodiment, the virtual game space 10 is displayed from a so-called third-party point of view, instead of the bird's-eye point of view. In addition, the present embodiment is the same as the configuration, the processing, and the procedure in the first and second embodiments, except for points specifically described below. Therefore, detailed description of those matters will be omitted.

Figure 13:
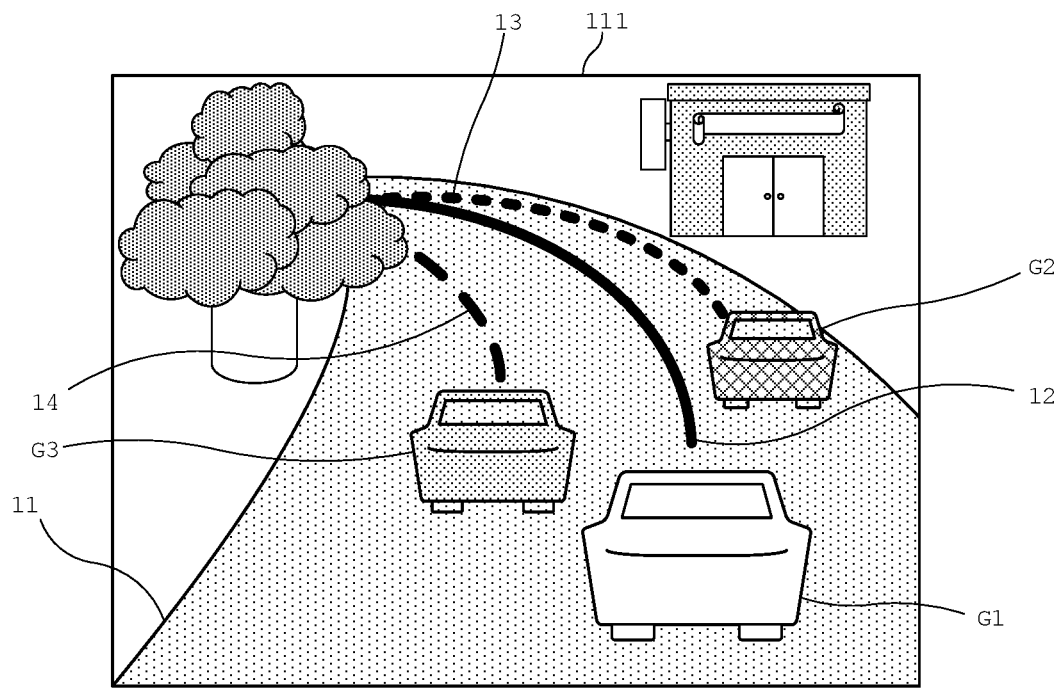
FIG. 13 is a diagram illustrating an example of a screen displayed on the terminal apparatus 100 according to a third embodiment of the present disclosure.

FIG. 13 is a diagram illustrating an example of a screen displayed on the terminal apparatus 100 according to the third embodiment of the present disclosure. FIG. 13 illustrates an image of the virtual game space 10 captured by a virtual camera placed behind the virtual object G1 controlled by the user himself or herself, that is, an example of a screen when viewed from a third-party point of view. Specifically, the processor 112 performs controls such that the virtual object G1 controlled by the user himself or herself is displayed at the most front side on the traveling road object 11. In addition, in addition to the above, when there are other virtual objects G2 and G3 in the depth direction of the virtual object G1 in the virtual game space 10, the processor 112 performs control such that the virtual objects G2 and G3 are displayed at positions visible farther than the virtual object G1. In addition, the processor 112 displays the calculated predicted routes 12 to 14 so as to be superimposed on the traveling road object 11.

As described above, in the present embodiment, the virtual game space 10 is displayed from the so-called third-party point of view, instead of being displayed from the bird's-eye point of view. Even in such a case, since the predicted route can be displayed as in the first and second embodiments, the same effect as in the first and second embodiments can be obtained.

Fourth Embodiment

In the first to third embodiments, the processing relevant to the display of the predicted route has been described on the premise of a game application relevant to a so-called racing game. In a fourth embodiment, processing relevant to the display of the predicted route is applied to a sports game instead of the racing game. In addition, the present embodiment is the same as the configuration, the processing, and the procedure in the first to third embodiments, except for points specifically described below. Therefore, detailed description of those matters will be omitted.

Figure 14:
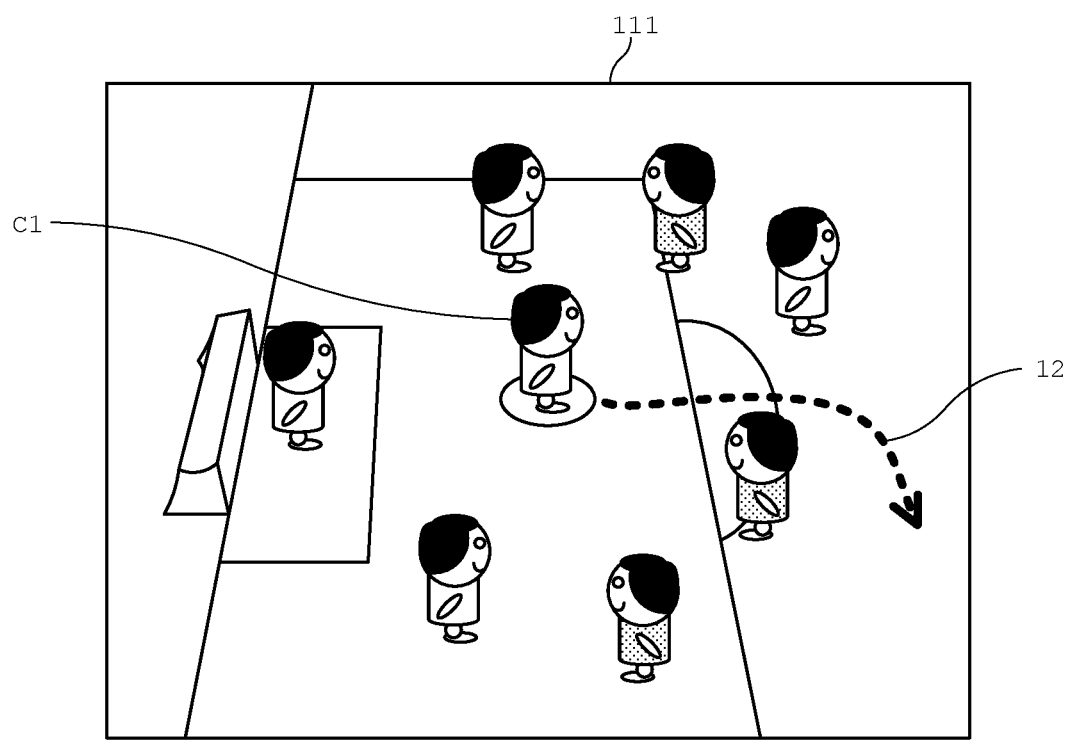
FIG. 14 is a diagram illustrating an example of a screen displayed on the terminal apparatus 100 according to a fourth embodiment of the present disclosure.

FIG. 14 is a diagram illustrating an example of a screen displayed on the terminal apparatus 100 according to the fourth embodiment of the present disclosure. FIG. 14 illustrates a screen in which virtual objects of each ally character and virtual objects of each enemy character are arranged in a virtual game space simulating soccer. Specifically, the processor 112 arranges respective characters in the virtual game space with reference to the virtual object information table. Then, a user input is received, and a predicted route of a virtual object C1 currently controlled by the user is calculated. This calculation can be performed by the same processing as in the other embodiments. Then, the processor 112 displays the calculated predicted route 12 on the display 111 so as to be superimposed on the virtual game space. In addition, although the predicted route is calculated based on the speed information and the weight information in the other embodiments, the predicted route may be calculated by further taking the arrangement coordinate information of other virtual objects into consideration in addition to these. That is, as illustrated in FIG. 14, the predicted route 12 may be set so as to avoid another virtual object C2.

As described above, in the present embodiment, the processing relevant to the display of the predicted route is applied to a sports game instead of a so-called racing game. Even in such a case, since the predicted route can be displayed as in the first to third embodiments, the same effect as in the first to third embodiments can be obtained.

Fifth Embodiment

In the first to fourth embodiments, the processing relevant to the display of the predicted route of the vehicle-shaped virtual object or the character-like virtual object in the game application relevant to a so-called racing game or sports game has been described. In a fifth embodiment, processing relevant to the display of a predicted route of a ball-shaped virtual object moving in a virtual game space in a sports game or the like will be described. In addition, the present embodiment is the same as the configuration, the processing, and the procedure in the first to fourth embodiments, except for points specifically described below. Therefore, detailed description of those matters will be omitted.

Figure 15:
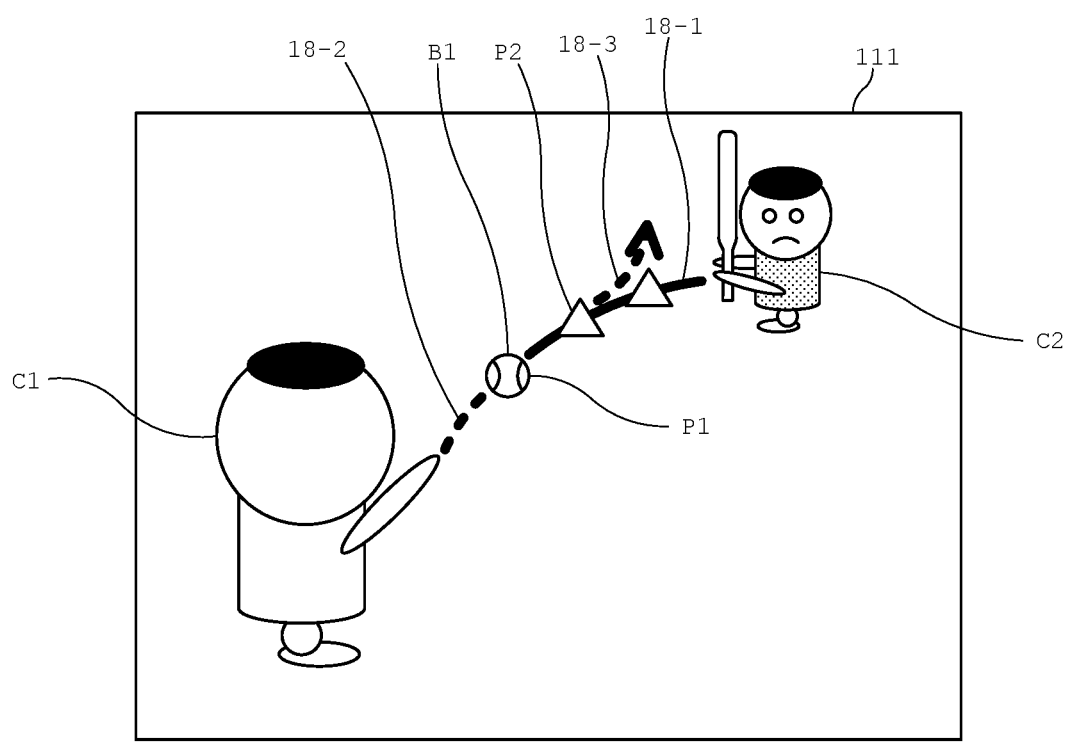
FIG. 15 is a diagram illustrating an example of a screen displayed on the terminal apparatus 100 according to a fifth embodiment of the present disclosure.

FIG. 15 is a diagram illustrating an example of a screen displayed on the terminal apparatus 100 according to the fifth embodiment of the present disclosure. According to FIG. 15, a virtual character object C1 controlled based on an instruction input that is input by a user and a virtual character object C2 controlled by another user or a computer are arranged in a virtual game space simulating baseball. In addition, a ball-shaped virtual object B1 is arranged in the virtual game space, and moves from the position of the virtual character object C1 to the vicinity of the position of the virtual character object C2 based on the user's instruction input.

Here, in such a game application that simulates baseball, usually, when an instruction for the movement (for example, pitching) of the ball-shaped virtual object B1 from the position of the virtual character object C1 (for example, pitcher) is given, the movement route (the course of the ball) is also determined. That is, after the movement (for example, pitching) of the ball-shaped virtual object B1 from the position of the virtual character object C1 (for example, pitcher) is started, the user cannot control the movement route of the virtual object B1. In the present embodiment, when an instruction input for starting the movement (for example, pitching) of the ball-shaped virtual object B1 is received, the movement route of the virtual object B1 is predicted in response thereto, and the predicted movement route is displayed on the display 111. Then, during the movement, the predicted route is calculated again according to the time during which the instruction input is continued, and the virtual object B1 is moved on the calculated route again. Therefore, as in the first to third embodiments, even if a future predicted route is once determined, it is possible to change the movement route and the subsequent predicted route in real time according to an instruction input while on the predicted route.

According to FIG. 15, a predicted route 18-1 is displayed on the display 111 as a predicted route when the movement of the ball-shaped virtual object B1 from the virtual character object C1 is started. Thereafter, if a new instruction input is received from the user when the virtual object B1 moves on the predicted route 18-1 and reaches a position P1, the predicted route is calculated again, so that the virtual object B1 deviates from the predicted route 18-1 from a position P2 and a predicted route 18-3 is displayed. In addition, the calculation of the predicted route 18-1 or 18-3 and the control relevant to the movement of the virtual object on the predicted route are the same as the method and processing described in the first embodiment with reference to FIG. 6.

In addition, in the example illustrated in FIG. 15, a case where the present invention is applied to the control relevant to the movement of a ball in baseball has been described. However, the present invention can also be similarly applied to control of movement of a soccer ball, golf swing (movement of a club), darts, and the like.

As described above, in the present embodiment, the processing relevant to the display of the predicted route is applied to a sports game instead of a so-called racing game. Even in such a case, since the predicted route can be displayed as in the first to third embodiments, the same effect as in the first to third embodiments can be obtained.

Other Embodiments

It is also possible to appropriately combine the components described in the embodiments or replace these to configure a system.

The processes and procedures described in this specification can be realized not only by those explicitly described in the embodiments but also by software, hardware, or a combination thereof. Specifically, the processes and procedures described in this specification are realized by mounting logic corresponding to the processes on a medium, such as an integrated circuit, a volatile memory, a nonvolatile memory, a magnetic disk, or an optical storage. In addition, the processes and procedures described in this specification can be mounted as computer programs that can be executed by various computers including a terminal apparatus or a server apparatus.

Even if the processes and procedures described in this specification are described to be performed by a single apparatus, single software, a single component, and a single module, such processes or procedures can also be performed by a plurality of apparatuses, a plurality of pieces of software, a plurality of components, and/or a plurality of modules. In addition, even if the various kinds of information described in this specification are described to be stored in a single memory or a single storage unit, such information can be stored in a plurality of memories provided in a single apparatus or a plurality of memories, which are arranged in a plurality of apparatuses, in a distributed manner. In addition, the software and hardware elements described in this specification can be implemented by integrating these into a smaller number of components or by decomposing these into a larger number of components.

The processing apparatus, program, and method being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A processing apparatus comprising:
    an input interface configured to receive from a user an input for controlling a movement route of a virtual object arranged in a virtual game space;
    a memory configured to store arrangement information in the virtual game space and computer readable instructions, the arrangement information being associated with the virtual object;
    a display configured to display predetermined information; and
    a processor configured to execute the computer readable instructions so as to:
        arrange the virtual object at a predetermined position in the virtual game space based on the arrangement information stored in the memory;
        determine a speed of movement of the virtual object from the predetermined position based on the input via the input interface;
        calculate a predicted route, along which the virtual object will move from the predetermined position, based on the input via the input interface and the determined speed; and
        output the predicted route to the display when the determined speed is higher than a predetermined speed.

2. The processing apparatus according to claim 1, wherein the predicted route is changed based on a duration of time during which the input from the user continues via the input interface.

3. The processing apparatus according to claim 1, wherein the predicted route is output even when the reception of the input from the user ends via the input interface.

4. The processing apparatus according to claim 1, wherein the memory is configured to store a predetermined parameter that is associated with the virtual object, and
    the processor is configured to calculate the predicted route based on the predetermined parameter in addition to the input via the input interface and the determined speed.

5. The processing apparatus according to claim 4, wherein the predetermined parameter is a weight parameter of the virtual object.

6. The processing apparatus according to claim 1, wherein the processor is configured to output at least a part of a trajectory, along which the virtual object has moved, to the display in addition to the predicted route.

7. The processing apparatus according to claim 1, wherein a traveling road object is arranged in the virtual game space, and the virtual object is recommended to move on the traveling road object, and
    the processor is configured to output the traveling road object to the display.

8. The processing apparatus according to claim 7, wherein the processor is configured to display a warning on the display when the predicted route deviates from the traveling road object.

9. A computer program product embodying computer readable instructions stored on a non-transitory computer-readable storage medium for causing a computer to execute a process by a processor, the computer including:
    an input interface configured to receive from a user an input for controlling a movement route of a virtual object arranged in a virtual game space;
    a memory configured to store arrangement information in the virtual game space that is associated with the virtual object; and
    a display configured to display predetermined information,
    the computer configured to perform the steps of:
        arranging the virtual object at a predetermined position in the virtual game space based on the arrangement information stored in the memory;
        determine a speed of movement of the virtual object from the predetermined position based on the input via the input interface;
        calculating a predicted route, along which the virtual object will move from the predetermined position, based on the input via the input interface and the determined speed; and
        outputting the predicted route to the display when the determined speed is higher than a predetermined speed.

10. The computer program product according to claim 9, wherein the predicted route is changed based on a duration of time during which the input from the user continues via the input interface.

11. A method for causing a processor in a computer to execute a process, the computer including:
    an input interface configured to receive from a user an input for controlling a movement route of a virtual object arranged in a virtual game space;
    a memory configured to store arrangement information in the virtual game space and computer readable instructions, the arrangement information being associated with the virtual object; and a display configured to display predetermined information, the method comprising executing the computer readable instructions on the processor the steps of:
  arranging the virtual object at a predetermined position in the virtual game space based on the arrangement information stored in the memory;
  determine a speed of movement of the virtual object from the predetermined position based on the input via the input interface;
  calculating a predicted route, along which the virtual object will move from the predetermined position, based on the input via the input interface and the determined speed; and
  outputting the predicted route to the display when the determined speed is higher than a predetermined speed.

12. The method according to claim 11,
wherein the predicted route is changed based on a duration of time during which the input from the user continues via the input interface.

13. A processing apparatus comprising:
an input interface configured to receive from a user an input for controlling a movement route of a virtual object arranged in a virtual game space;
a memory configured to store arrangement information in the virtual game space and computer readable instructions, the arrangement information being associated with the virtual object;
a display configured to display predetermined information; and
a processor configured to execute the computer readable instructions so as to:
  arrange the virtual object at a predetermined position in the virtual game space based on the arrangement information stored in the memory;
  calculate a predicted route, along which the virtual object will move from the predetermined position, based on the input via the input interface; and
  output the predicted route to the display,
wherein a traveling road object is arranged in the virtual game space, and the virtual object is recommended to move on the traveling road object, and
the processor is configured to output the traveling road object to the display.

14. The processing apparatus according to claim 13,
wherein the processor is configured to display a warning on the display when the predicted route deviates from the traveling road object.

15. The processing apparatus according to claim 13,
wherein the predicted route is changed based on a duration of time during which the input from the user continues via the input interface.

16. A computer program product embodying computer readable instructions stored on a non-transitory computer-readable storage medium for causing a computer to execute a process by a processor, the computer including:

an input interface configured to receive from a user an input for controlling a movement route of a virtual object arranged in a virtual game space;
a memory configured to store arrangement information in the virtual game space that is associated with the virtual object; and
a display configured to display predetermined information,
the computer configured to perform the steps of:
  arranging the virtual object at a predetermined position in the virtual game space based on the arrangement information stored in the memory;
  calculating a predicted route, along which the virtual object will move from the predetermined position, based on the input via the input interface; and
  outputting the predicted route to the display,
wherein a traveling road object is arranged in the virtual game space, and the virtual object is recommended to move on the traveling road object, and
the processor is configured to output the traveling road object to the display.

17. The computer program according to claim 16,
wherein the processor is configured to display a warning on the display when the predicted route deviates from the traveling road object.

18. The computer program according to claim 16,
wherein the predicted route is changed based on a duration of time during which the input from the user continues via the input interface.

19. A method for causing a processor in a computer to execute a process, the computer including:
an input interface configured to receive from a user an input for controlling a movement route of a virtual object arranged in a virtual game space;
a memory configured to store arrangement information in the virtual game space and computer readable instructions, the arrangement information being associated with the virtual object; and
a display configured to display predetermined information,
the method comprising executing the computer readable instructions on the processor the steps of:
  arranging the virtual object at a predetermined position in the virtual game space based on the arrangement information stored in the memory;
  calculating a predicted route, along which the virtual object will move from the predetermined position, based on the input via the input interface; and
  outputting the predicted route to the display,
wherein a traveling road object is arranged in the virtual game space, and the virtual object is recommended to move on the traveling road object, and
the processor is configured to output the traveling road object to the display.

20. The method according to claim 19,
wherein the processor is configured to display a warning on the display when the predicted route deviates from the traveling road object.

* * * * *